(12) United States Patent
Fruth (10) Patent No.: US 9,815,242 B2
(45) Date of Patent: *Nov. 14, 2017

(54) APPARATUS FOR MANUFACTURING THREE-DIMENSIONAL OBJECTS

(71) Applicant: FIT AG, Lupburg (DE)

(72) Inventor: Carl Fruth, Parsberg (DE)

(73) Assignee: FIT AG, Lupburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/913,739

(22) PCT Filed: Aug. 22, 2014

(86) PCT No.: PCT/EP2014/002307
§ 371 (c)(1),
(2) Date: Feb. 23, 2016

(87) PCT Pub. No.: WO2015/024671
PCT Pub. Date: Feb. 26, 2015

(65) Prior Publication Data
US 2016/0214318 A1    Jul. 28, 2016

(30) Foreign Application Priority Data
Aug. 23, 2013   (DE) .................. 10 2013 109 162

(51) Int. Cl.
*B29C 67/00*      (2017.01)
*B22F 3/105*      (2006.01)
(Continued)

(52) U.S. Cl.
CPC ........ *B29C 67/0077* (2013.01); *B22F 3/1055* (2013.01); *B28B 1/001* (2013.01);
(Continued)

(58) Field of Classification Search
None
See application file for complete search history.

(56) References Cited

U.S. PATENT DOCUMENTS 5,155,321 A * 10/1992 Grube .................. B22F 3/1055
                                                    219/121.85
5,639,070 A *  6/1997 Deckard ............ B23K 26/0624
                                                         264/434
(Continued)

FOREIGN PATENT DOCUMENTS

CN           1741895 A      3/2006
CN         101208190 A      6/2008
(Continued)

*Primary Examiner* — Jacob T Minskey
*Assistant Examiner* — Baileigh K Darnell
(74) *Attorney, Agent, or Firm* — Laurence A. Greenberg; Werner H. Stemer; Ralph E. Locher (57) ABSTRACT

An apparatus and a method are provided for manufacturing three-dimensional objects by selective solidification of a build material applied in layers. A heating element having at least two functional openings is used to improve the manufacturing process and in particular to optimize heat input. One of the at least two functional openings serves as a material passthrough and another of the at least two functional openings simultaneously serves as a radiation passthrough. An additional heating and/or cooling device serves to control the temperature of build material applied through the material passthrough.

14 Claims, 4 Drawing Sheets

(51) Int. Cl.
  *B28B 1/00* (2006.01)
  *B28B 17/00* (2006.01)
  *B33Y 10/00* (2015.01)
  *B33Y 30/00* (2015.01)
  *B33Y 50/02* (2015.01)
  *B29K 105/00* (2006.01)

(52) U.S. Cl.
  CPC ...... *B28B 17/0081* (2013.01); *B29C 67/0085* (2013.01); *B29C 67/0088* (2013.01); *B29C 67/0092* (2013.01); *B22F 2003/1056* (2013.01); *B22F 2003/1057* (2013.01); *B29K 2105/251* (2013.01); *B33Y 10/00* (2014.12); *B33Y 30/00* (2014.12); *B33Y 50/02* (2014.12); *Y02P 10/295* (2015.11)

(56) References Cited

U.S. PATENT DOCUMENTS

| | | |
|---|---|---|
| 7,850,885 B2 | 12/2010 | Philippi et al. |
| 8,047,251 B2 | 11/2011 | Khoshnevis |
| 8,414,281 B2 | 4/2013 | Schleiss et al. |
| 8,945,456 B2 | 2/2015 | Zenere |
| 2008/0131104 A1 | 6/2008 | Philippi |
| 2008/0131546 A1 | 6/2008 | Perret et al. |
| 2011/0165340 A1 | 7/2011 | Baumann |

FOREIGN PATENT DOCUMENTS

| | | |
|---|---|---|
| CN | 102470608 A | 5/2012 |
| EP | 1674192 A1 | 6/2006 |
| JP | 2008540173 A | 11/2008 |
| JP | 2011140222 A | 7/2011 |
| WO | 2006125507 A1 | 11/2006 |

\* cited by examiner

APPARATUS FOR MANUFACTURING THREE-DIMENSIONAL OBJECTS

BACKGROUND OF THE INVENTION

Field of the Invention

The invention relates to an apparatus and a method for manufacturing three-dimensional objects by selective solidification of a build material applied in layers.

A large number of apparatuses and methods for manufacturing three-dimensional objects by selective solidification of a build material applied in layers are known from the existing art. Laser sintering or selective mask sintering, for example, may be recited here. Systems with which a layer manufacturing method of this kind can be carried out are also referred to as "rapid prototyping" systems. These layer manufacturing methods serve to manufacture components built up in layers from solidifiable material such as resin, plastic, metal, or ceramic, and are used, for example, to produce engineering prototypes. Using an additive production method, three-dimensional objects can be manufactured directly from CAD data.

In a layer manufacturing method of this kind, the objects are built up in layers, i.e. layers of a build material are applied successively over one another. Before application of the respective next layers, the locations in the respective layers which correspond to the object to be manufactured are selectively solidified. Solidification is accomplished, for example, by local heating of a usually powdered layering raw material using a radiation source. An exactly defined object structure of any kind can be generated by controlled introduction of radiation in suitable fashion into the desired regions. The layer thickness is also adjustable. A method of this kind is usable in particular for the manufacture of three-dimensional bodies by successively generating multiple thin, individually configured layers.

The build material to be solidified is typically preheated to a temperature that is below the processing temperature. The processing temperature is then attained with the aid of an additional energy input.

In a laser sintering process, for example, a plastic material is preheated to a temperature below the sintering temperature. The energy introduced by the laser then contributes only the differential quantity of heat for fusing the powder particles.

Preheating is accomplished in many cases by heating the build platform. With this heating "from below," however, the preheating heat flow decreases as the component height increases, due to losses and the increasing volume of the powder charge.

Other methods also result in an undesired irregular temperature distribution in the build material. This also applies in particular to those methods in which preheating is accomplished by heat delivery "from above." Here devices that can be intermittently heated are placed above the build layer. Complex systems for controlling the heat curve, and other laborious actions, are used in an attempt to achieve a uniform temperature distribution in the build material to be preheated.

BRIEF SUMMARY OF THE INVENTION

An object of the present invention is to improve the manufacturing process, in particular to optimize heat input.

This object is achieved respectively by an apparatus and by a method as described below. Advantageous embodiments of the invention are indicated in the description below as well. The advantages and configurations explained below in connection with the apparatus also apply analogously to the method according to the present invention, and vice versa.

The invention proposes no longer pursuing the cycle-timed manufacturing procedure known from the existing art, in which, within one clock cycle, after an application of material firstly a preheating action and then a selective solidification action occur before another material application is performed in a subsequent new clock cycle. The invention instead proposes a continuous manufacturing process in which application of the build material, preheating, and selective solidification occur simultaneously by local heating of the build material, specifically at different sites on the same objects to be manufactured or also on different objects simultaneously if multiple objects are being manufactured on the build platform.

The apparatus according to the present invention encompasses a build platform, arranged in an X-Y plane, on which at least one three-dimensional object is generated in layers; a heating element, at least partly overlying the build platform, for inputting thermal energy into the build material; and a drive device for generating a relative motion in an X-Y direction between the build platform and the heating element. The heating element comprises at least two simultaneously usable functional openings, one of the at least two functional openings being embodied as a material passthrough and another of the at least two functional openings being embodied as a radiation passthrough. According to the present invention the apparatus encompasses an additional heating and/or cooling device for controlling the temperature of build material applied through the material passthrough.

The method according to the present invention correspondingly encompasses the steps of: generating the at least one three-dimensional object, in layers, on a build platform arranged in an X-Y plane; inputting thermal energy into the build material with the aid of a heating element at least partly overlying the build platform; generating a relative motion in an X and/or Y direction between the build platform and the heating element by means of a drive device; and simultaneously causing build material and radiation energy to pass through the heating element using at least two functional openings. According to the present invention the method encompasses heating or cooling, by means of an additional heating and/or cooling device, of the build material applied through the material passthrough.

A fundamental idea of the invention is the use of a heating element that serves to preheat the build material and is notable for functional openings that serve as a material passthrough and radiation passthrough, therefore as a coating opening for the application of build material and as an exposure opening for local heating of the build material. When a heating element of this kind is moved in suitable fashion relative to the build platform, the application of build material, preheating, and selective solidification can occur simultaneously, i.e. non-cycle-timed, uninterrupted manufacture of the at least one object. In other words, the object or objects is built up continuously, the build rate being determined by the relative motion between the build platform and heating element. The geometric arrangement of the object regions located in the various manufacturing process phases, in particular the spacing of said object regions from one another, is determined by the arrangement of the functional openings in the heating element, in particular by the spacing of said functional openings from one another.

For example, in a first object region the build material in the form of a freshly applied powder charge is being preheated by the heating element, while in a second object region arranged behind the first object region in the motion direction, a layer n is currently being solidified with the aid of radiation energy penetrating through an exposure opening. At the same time, in a third object region that is located behind the second object region in the motion direction, post-heating of the build layer n, just previously solidified there, is being performed by the heating element, while in a fourth object region located behind the third object region, further build material for a subsequent layer n+1, introduced through a coating opening, is being applied onto the layer n that is already present. The object regions can be regions of one object or regions of different objects if multiple objects are arranged on the build platform.

Heat delivery for preheating is accomplished "from above," so that the disadvantages of heat delivery via the build platform do not occur. At the same time, heat delivery is preferably accomplished not only intermittently, i.e. not only when the heating element is located (as in the existing art) above the build layer for a short time, but instead constantly, this being made possible by the novel continuous working mode. Optimization of heat input is thereby achieved in simple fashion. At the same time, the manufacturing process as a whole is improved.

At the same time, the present invention allows elimination of the need for a uniform temperature distribution. Because the manufacturing method has made different degrees of progress at different sites, different temperatures at different sites can be advantageous. For example, in one region a preheating temperature can be advantageous in order to prepare the build material for imminent local heating; in an adjacent region, on the other hand, a post-heating temperature can be present, as is advantageous for achieving certain properties of the already solidified layer, for example in order to prevent warping.

Because the heating element is constantly available, a defined inhomogeneous temperature distribution of this kind can be implemented in particularly simple fashion. In an advantageous embodiment of the invention, the heating element comprises multiple regions capable of different temperature control. This is achieved, for example, with the aid of multiple mutually independently operable heating modules.

According to the present invention an additional heating and/or cooling device for controlling the temperature of build material applied through the material passthrough is provided. "Additional" means here that the heating and/or cooling device is provided in addition to the heating element that serves to preheat the build material, and in addition to the radiation source that serves for selective solidification of the build material.

The additional heating and/or cooling device heats or cools the build material applied through the material passthrough. It is thereby possible to apply a build material that is temperature-controlled in defined fashion, and/or to control in defined fashion the temperature of an already-applied build material.

The additional heating and/or cooling device can be embodied either only for heating or only for cooling, or preferably for selectable heating or cooling. The additional heating and/or cooling device correspondingly encompasses a number of suitable heating and/or cooling elements.

The additional heating and/or cooling device can serve in general to assist the action of the heating element. The additional heating and/or cooling device thus serves, alongside the heating element, directly or indirectly to furnish multiple differently temperature-controlled regions of the build material, or a defined temperature distribution within the build material arranged on the build platform.

In an embodiment of the invention an additional heating device of this kind is constituted by an additional heat source for furnishing thermal energy, in particular in the form of a radiation source. The radiation source can be arranged above the heating element. In this case preferably at least one of the functional openings is embodied as a heating opening for additional input of thermal energy. The heating opening can be a functional opening that already performs another function; for example, a radiation passthrough already serving as an exposure opening can serve at the same time as a heating opening.

In an embodiment of the invention a cooling element that is embodied to extract thermal energy, for example a thermoelectric converter, is used as an additional cooling device. In an embodiment of the invention, the arrangement of the cooling device corresponds to the above-described arrangement of the heating device, one of the functional openings being embodied as a cooling opening, or a functional opening that already performs a different function serving as a cooling opening.

Preferably, however, the additional heating and/or cooling device is embodied for direct and immediate control of the temperature of the build material, this temperature control preferably being accomplished before the build material is exposed to an intentional heating by the heating element. In other words, because the build platform and heating element move relative to one another, the additional temperature control of the build material is preferably accomplished before the build material disappears beneath the heating element.

More precisely, the additional temperature control is accomplished during the application operation, i.e. while the build material is passing through the coating opening, and/or immediately thereafter. In other words, additional heating or cooling of the build material moving through the coating opening, or of the build material that has already been applied and is located directly beneath the coating opening or close to the coating opening, is accomplished.

For this purpose, the additional heating or cooling device is preferably arranged in the immediate vicinity of a coating opening, for example on an edge of the functional opening serving as a material passthrough. This coating opening thus serves simultaneously as a heating or cooling opening.

The heating or cooling of the build material while it is being applied is preferably accomplished indirectly. In other words, a heat transfer to or from the build material occurs, as thermal radiation or heat flow.

The use of a heat flow is particularly advantageous. In a particularly preferred embodiment of the invention the additional heating or cooling device is embodied in such a way that it effects control of the temperature of the build material with the aid of a suitably temperature-controlled gas flow. In this case the additional heating and/or cooling device is embodied to furnish a heating or cooling gas flow at the material application site, i.e. directly at the coating opening or in the vicinity of the coating opening. Temperature control of the build material can thus take place while the build material is passing through the coating opening and/or immediately subsequently thereto, i.e. in the context of the already-applied build material.

A gas flow of this kind passing through the build material or along the build material can not only effect heating or cooling of the build material.

If the gas flow is applied in suitable fashion, a further result that can be achieved is that particles, for example smoke or vapors, that form during solidification of the build material, i.e. for example during melting, do not settle on the solidifying material or contaminate surrounding surfaces. These particles can instead be removed in controlled fashion by the gas flow. Removal of these particles furthermore prevents contamination of the radiation source that is being utilized, for example of the laser, and of the optics being used; this contributes to smooth operation.

If the gas flow is used for cooling, the build method can be implemented at very high temperatures, in particular melt temperatures. Cooling of the build material by means of a gas flow then allows the build method to be implemented at temperatures at which, ordinarily, the build material being used already suffers damage.

Air can be used as a medium for the gas flow. Preferably, however, an inert gas suitable for the build method being used is utilized.

The additional heating and/or cooling device preferably also encompasses, besides heating and/or cooling elements, means for generating the gas flow which interact with the heating and/or cooling elements, and/or means for directing the gas flow along a suitable flow path. The means for generating the gas flow preferably encompass a suction apparatus that advantageously is placed between the heating element and the build layer.

Provision of a gas flow having a uniform gas speed is advantageous in order to avoid a disadvantageous negative effect on the build material, in particular to avoid turbulence or the like.

In a preferred exemplifying embodiment of the invention the additional heating and/or cooling device encompasses both heating and/or cooling elements and means for furnishing a temperature-controlled gas flow, so that the advantages of the different types of transfer—conduction, radiation, and flow—are advantageously combined with one another.

An embodiment of the invention in which the heating element is of substantially plate-shaped configuration has proven to be particularly advantageous for the transfer of heating energy to the build material. The plate-like shape of the heating element simultaneously makes possible a particularly simple embodiment of the functional openings. Advantageously, the heating element and build platform are embodied in such a way that they overlie one another over the largest possible area, preferably completely, or can be caused during the manufacturing process to overlie one another over as large an area as possible, preferably completely.

In a preferred embodiment of the invention the heating element is arranged above the build platform. In a variant, the heating element is spaced away from the respectively topmost build layer. Heating is accomplished by thermal radiation. In an alternative variant, the heating element touches the topmost build layer. Heating is then accomplished by thermal conduction.

If the build platform is located inside a process chamber that is closed in the operating state, the heating element can then serve as a demarcating wall of the process chamber. In other words, in this case the process chamber is closed off by the heating element. The heating element is then a part of the process chamber.

The coating opening is always an actual opening in the sense of a material perforation. For the exposure opening, however, the heating element need not necessarily be perforated. The exposure opening can also be embodied as a region of suitable material, in the basic body of the heating element, that is suitable for the passage of radiation.

In a preferred embodiment of the invention radiation energy is introduced through the exposure opening but said opening is not completely illuminated. Instead, a targeted irradiation of the build material arranged below said opening occurs, within the boundaries of said opening. The radiation can derive from one or more radiation sources. For example, for local heating of the build material one or more laser beams can execute a linear back-and-forth motion inside the functional opening within the window furnished by the functional opening, or the laser beams are guided in defined fashion inside the window on a nonlinear trajectory, in each case as a function of the structure to be generated. The radiation is guided with the aid of a suitable control system. The build material, previously preheated to a temperature below the processing temperature, becomes locally further heated. The processing temperature is reached with the aid of this additional energy input.

In a simple variant of the invention the arrangement and size of the functional openings is unmodifiable. It has proven advantageous, for example, to use strip-shaped functional openings that lie parallel to one another. The functional openings are advantageously arranged in the heating element perpendicularly to the direction of relative motion, for example perpendicularly to the X direction or Y direction. Alternatively, it is possible for the functional openings to be arranged obliquely, i.e. at an angle to the motion direction. It is advantageous in the context of the present invention that the shape, arrangement, and size of the functional openings can be adapted to the special aspects of the method. Instead of strip- or slit-shaped functional openings, for example, orifice-shaped functional openings or functional openings of any other shape can also be provided for for all or for individual functions.

In an alternative variant the shape, arrangement, and/or size of the functional openings is modifiable. For example, it can be advantageous to embody the size of the exposure opening modifiably, in particular when said functional opening serves as an aperture stop, i.e. serves to demarcate the cross section of the introduced radiation. It can likewise be advantageous to embody the size of the coating opening modifiably, in particular when the shape and/or size of said opening directly determine the application location or volume of build material applied for each unit time. A modification of the functional openings can also be accomplished in particular during runtime, i.e. while the manufacturing process is in progress. Additional suitable drive and control devices are then to be provided for this as applicable.

It is not only heat input into the build material that is improved with the present invention. In addition, thanks to a suitable interaction of the arrangement and size of the functional openings and the relative motion between the heating element and build platform, and the manner in which radiation for local solidification of the build material is furnished and/or guided, the manufacturing process can also be carried out particularly efficiently.

This purpose is served by a central control system for the manufacturing process using a data model for description of the object to be manufactured with the aid of the layer building method. The control system encompasses all relevant operations of the manufacturing process that proceeds simultaneously at multiple sites in different manufacturing phases, i.e. manufacturing processes that have made different degrees of progress. In other words, control always occurs in accordance with the actual progress of the manufacturing process, using for this purpose sensor data of suitable sensors, in particular temperature sensors. The control system encompasses in particular control of the heating of the heating element, here optionally the defined control of individual temperature regions. The control system also encompasses control of the drive device for the relative motions between the heating element and build platform, and control of the furnishing and/or application device for furnishing and/or applying the build material, and control of the guided radiation source(s) for local heating of the build material and, if applicable, control of the additional heating and/or cooling device as well as also, if applicable, control of the functional openings of modifiable arrangement and/or size.

All calculation operations necessary in connection with control of the layer manufacturing system and with execution of the method according to the present invention are performed by one or more data processing units that are embodied for carrying out said operations. Each of these data processing units preferably has a number of functional modules, each functional module being embodied to carry out a specific function or a number of specific functions in accordance with the method described. The functional modules can be hardware modules or software modules. In other words, insofar as it relates to the data processing unit the invention can be realized either in the form of computer hardware or in the form of computer software, or in a combination of hardware and software. If the invention is realized in the form of software, i.e. as a computer program product, all the functions described are implemented by computer program instructions when the computer program is executed on a computer having a processor. The computer program instructions are realized in any programming language in a manner that is known per se, and can be furnished to the computer in any form, for example in the form of data packets that are transferred via a computer network, or in the form of a computer program product stored in a diskette, a CD-ROM, or another data medium.

BRIEF DESCRIPTION OF THE SEVERAL VIEWS OF THE DRAWING

An exemplifying embodiment of the invention will be described in further detail below with reference to the drawings, in which.

DESCRIPTION OF THE INVENTION

All the Figures show the invention not to scale, merely schematically, and only with its essential constituents. Identical reference characters correspond to elements having an identical or comparable function.

Figure 1:
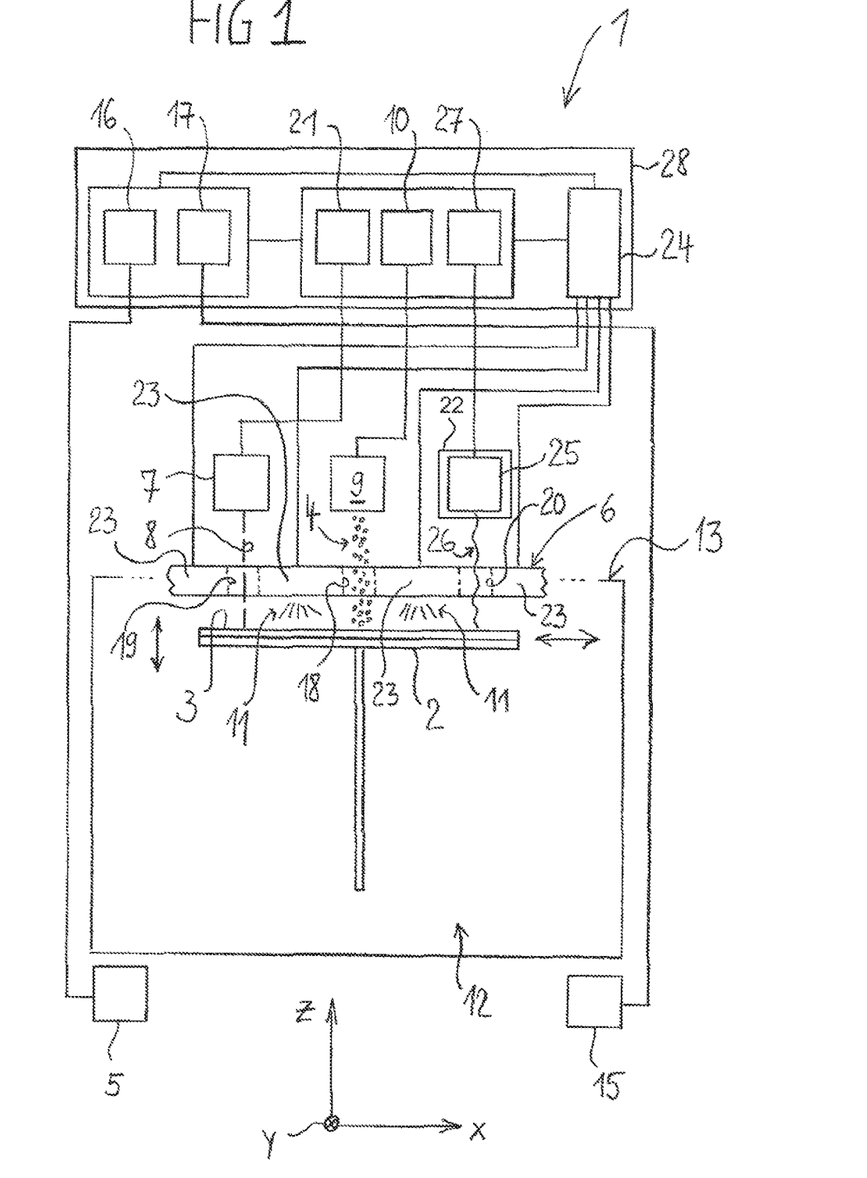
FIG. 1 schematically depicts an apparatus according to the present invention having a highly simplified process chamber depicted in section.
Figure 2:
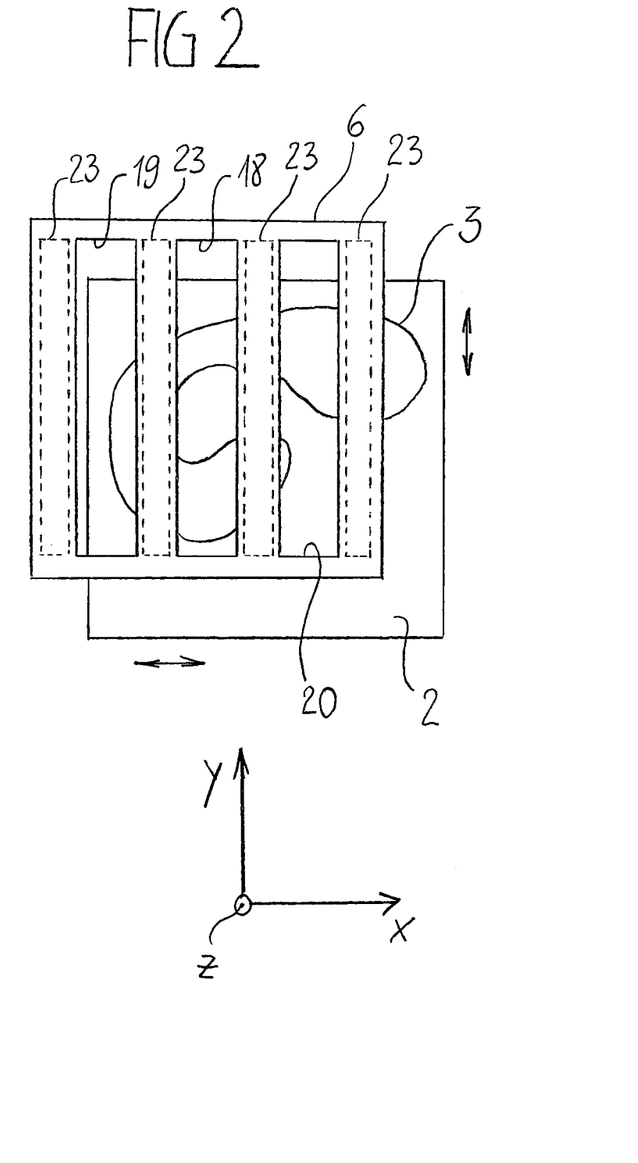
FIG. 2 is a schematic plan view of a heating element arranged above a build platform.

An apparatus 1 for laser sintering is described by way of example on the basis of FIGS. 1 and 2, as an apparatus for manufacturing at least one three-dimensional object by selective solidification of a build material applied in layers. The invention is not, however, limited to this specific method. The invention is also applicable to other additive production methods, for example laser melting, mask sintering, drop on powder/drop on bed, stereolithography, and the like.

An orthogonal coordinate system (X, Y, Z) is utilized in the description of the invention.

Apparatus 1 for laser sintering encompasses a build platform 2, arranged in an X-Y plane, on which a three-dimensional object 3 is generated in layers in known fashion. Build material 4 is a suitable plastic powder. After production of a layer n, in order to produce a new layer n+1 the build platform 2 having the already created and hardened layers is displaced downward over a specific travel length. This purpose is served by a drive device 5 for generating a relative motion in a Z direction, i.e. perpendicularly to the build plane, between build platform 3 and a heating element 6 described later in further detail. Drive device 5 is, for example, an electric motor.

Between solidification of a layer n and application of new build material 4 for a subsequent layer n+1, provision can be made to remove excess build material 4 from build platform 2. In this case a device suitable for this (not illustrated) is provided, for example in the form of a wiping blade or the like, which advantageously is connected to or interacts with heating element 6.

Apparatus 1 encompasses at least one radiation source 7 that furnishes radiation energy for local heating of build material 4 in order to selectively solidify the latter. The at least one radiation source 7 is, for example, a laser that delivers a laser beam 8 in guided fashion.

Apparatus 1 furthermore encompasses at least one furnishing and/or application device 9 with which build material 4 is furnished and/or is applied onto build platform 2 or onto a build layer that is already present. Furnishing and/or application device 9 is, for example, a device for applying a powder charge. Furnishing and/or application device 9 is connected to a corresponding control system 10 that controls the application of material.

Apparatus 1 further encompasses heating element 6 (already mentioned above) for introducing thermal energy into build material 4, which element constantly at least partly overlies build platform 2 during the manufacturing process. Heating element 6 is of substantially plate-like configuration. It is arranged above build platform 2, being spaced away from the respectively topmost build layer. The spacing is typically between 100 μm and 10 mm. Heating of build material 4 is accomplished by thermal radiation 11 delivered by heating element 6, as depicted symbolically in FIGS. 1 and 3.

Build platform 2 is located inside a process chamber 12, closed in the operating state, that is merely schematically indicated in FIG. 1. Heating element 6 serves here as a demarcation wall of process chamber 12. More precisely, heating element 6 is embodied as part of upper cover 13 of process chamber 12.

Apparatus 1 further encompasses a drive device 15 for generating a relative motion between build platform 2 and heating element 6 in an X and/or Y direction, i.e. in a layer direction. Drive device 15 is, for example, an electric motor. The two drive devices 5, 15 are connected to corresponding drive control systems 16, 17.

In the exemplifying embodiment described here, drive device 15 moves build platform 2 relative to the stationary heating element 6. The principal motion direction is the X direction. In the simplest case, the motion of build platform 2 is limited to this principal motion direction. If necessary or advantageous for the manufacturing process, the motion in an X direction can be overlaid by a motion of build platform 2 in a Y direction.

Heating element 6 comprises at least two, in the example depicted in FIG. 1 three simultaneously usable functional openings 18, 19, 20 spaced apart from one another. Functional openings 18, 19, 20 are slit- or strip-shaped, elongatedly rectangular, and lie parallel to one another and perpendicular to the principal motion direction, here the X direction. One of the functional openings is embodied as a material passthrough 18 and another of the functional openings as a radiation passthrough 19. During the production of object 3, both build material 4 and radiation energy, here in the form of laser beam 8, are allowed to pass simultaneously through functional openings 18, 19.

Expressed differently, the one functional opening is embodied as a coating opening 18 for the application of build material 4 onto build platform 2 or onto a build layer that is already present, and the other functional opening is embodied as an exposure opening 19 for simultaneous introduction of radiation energy of the at least one radiation source 7 into the applied build material 4 in order to solidify build material 4.

Radiation energy for local heating of build material 4 is introduced by guiding laser beam 8 through exposure opening 19 on a defined path. Laser beam 8 is guided with the aid of a suitable drive and control device 21.

Heating element 6 comprises multiple heating modules 23, to which control can be applied mutually independently and which are arranged between or next to functional openings 18, 19, 20. All the heating modules 23 of heating element 6 are connected to a heating control system 24. The working principle of heating modules 23 is based, for example, on the principle of electrical induction. Other suitable functioning modes for the heating modules are likewise possible.

In the example illustrated in FIG. 1, apparatus 1 also encompasses an additional heating device 22 having a heat source in the form of a radiation source 25, arranged above heating element 6, for furnishing thermal energy. This additional radiation source 25 is, for example, an infrared radiator that delivers infrared radiation 26. A suitable control system 27 is provided for this radiation source as well. This additional radiation source 25 has associated with it a dedicated functional opening 20 that thus serves as a heating opening.

A central control system 28 is responsible for controlled execution of the manufacturing method. Control system 28 encompasses for this purpose all the relevant control subsystems 10, 16, 17, 21, 24, 27.

Various phases of manufacture will be described below with reference to FIG. 3. What is used here is a heating element 6', different from heating element 6 shown in FIGS. 1 and 2, that possesses three functional openings, namely two coating openings 18, 18' and one exposure opening 19 arranged between coating openings 18, 18'.

Figure 3:
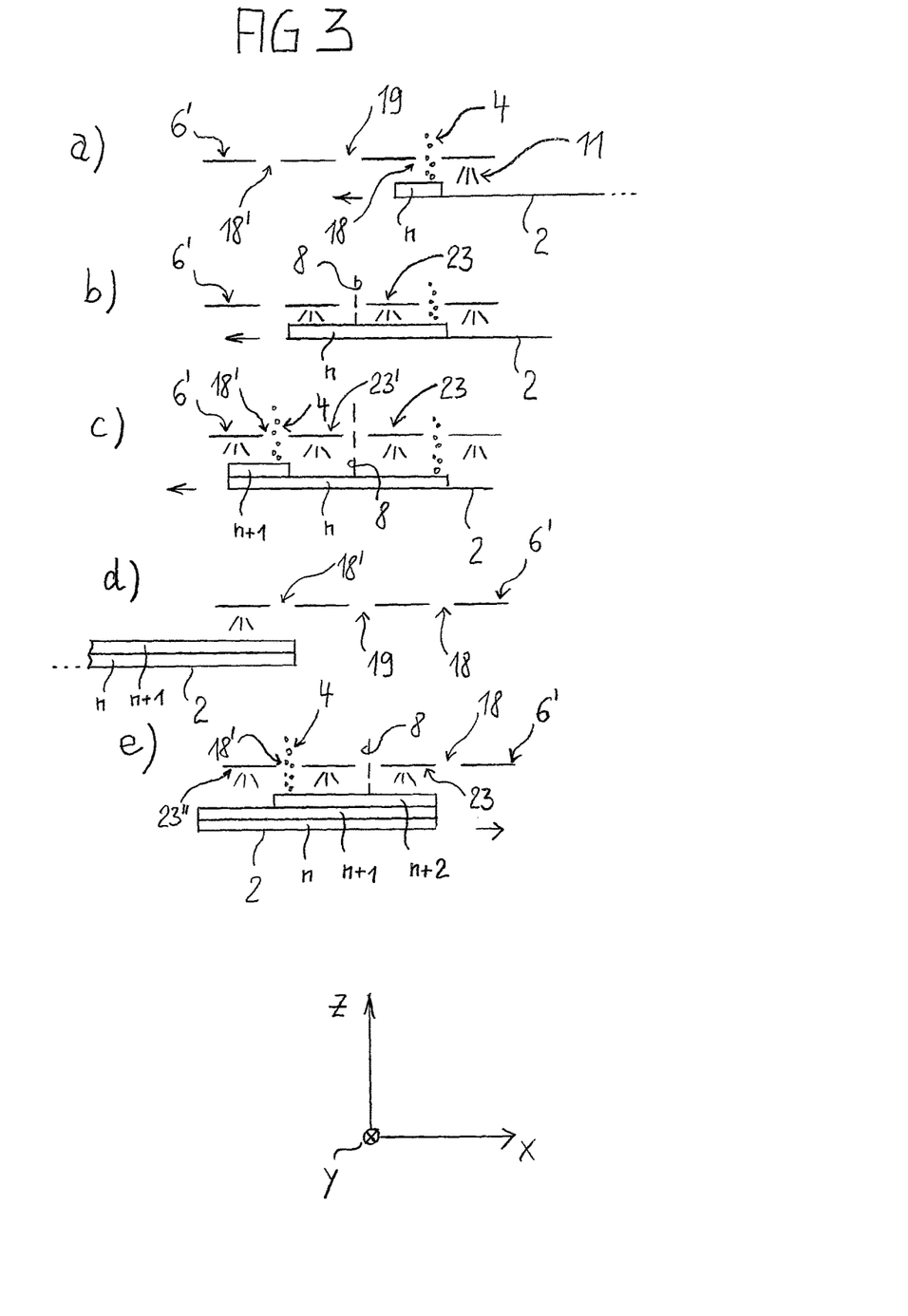
FIG. 3 shows simplified sectioned depictions of layers of the object to be built up, in different manufacturing phases.

In FIG. 3a, build platform 2, driven by drive device 15, moves through in an X direction beneath first coating opening 18 of heating element 6. Build material 4 for a layer n becomes deposited onto build platform 2.

In FIG. 3b, build platform 2 moves farther in an X direction. Build material 4 that was applied shortly beforehand becomes preheated, by a heating module 23 arranged between first coating opening 18 and exposure opening 19 in the basic body of heating element 6, to a temperature below the sintering temperature. At the same time, in an adjacent object region preheated just previously, additional thermal energy is introduced with the aid of laser beam 8 through exposure opening 19, with the result that the powder particles fuse.

In FIG. 3c, build platform 2 moves farther in an X direction. Before build platform 2 reaches second coating opening 18', it is moved a requisite travel distance downward in the Z direction, driven by drive device 5. Build material 4 for a further layer n+1 is applied through second coating opening 18'. This object region had just previously been heated again by a further heating module 23' arranged between exposure opening 19 and second coating opening 18'.

In FIG. 3d, build platform 2 has reached its one reversal point. Layers n and n+1 have been generated. Because there is no longer an exposure opening 19 located above build platform 2, at this moment laser irradiation is no longer taking place. The application of build material 4 also occurs only as long as at least one of the two coating openings 18, 18' is arranged above build platform 2.

In FIG. 3e, build platform 2 moves through beneath heating element 6 in an X direction, oppositely to the first motion. With the aid of second coating opening 18', a new application of material for the next layer n+2 has already occurred, as has preheating with the aid of a third heating module 23". Build platform 2, driven by drive device 5, has previously been moved down again a necessary distance in the Z direction. A local irradiation with laser beam 8 occurs through exposure opening 19 in order to solidify the structure to be generated. First heating module 23 serves for post-heating. Upon a further motion of build platform 2, an application of material for layer n+3 will occur shortly through first coating opening 18.

Figure 4:
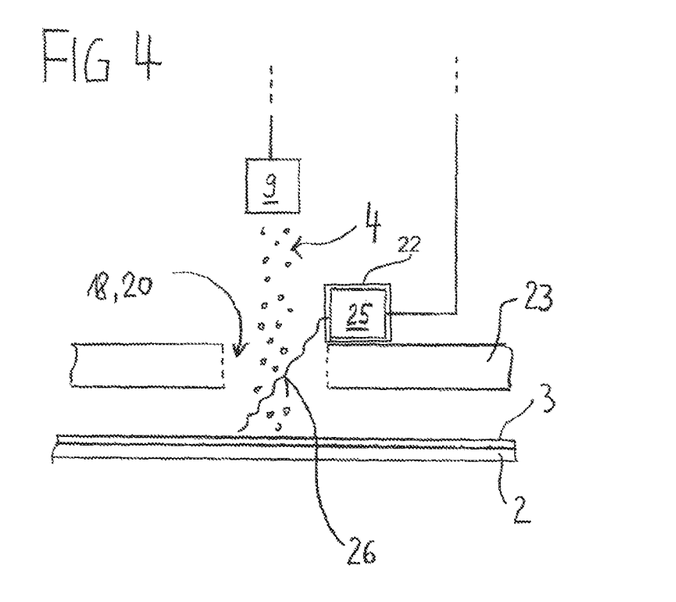
FIG. 4 is a detail of the apparatus according to the present invention having an additional heating and/or cooling device.

FIG. 4 shows an exemplifying embodiment of the invention having an additional heating device 22 for controlling the temperature of build material 4 that falls through coating opening 18. As in the example illustrated in FIG. 1, a thermal radiator 25, controllable by control system 27 and arranged at an edge of coating opening 18, serves as a heating element. If a cooling device or a combined heating and/or cooling device is provided instead of heating device 22, a cooling element (not depicted) takes the place of heating element 25.

Figure 5:
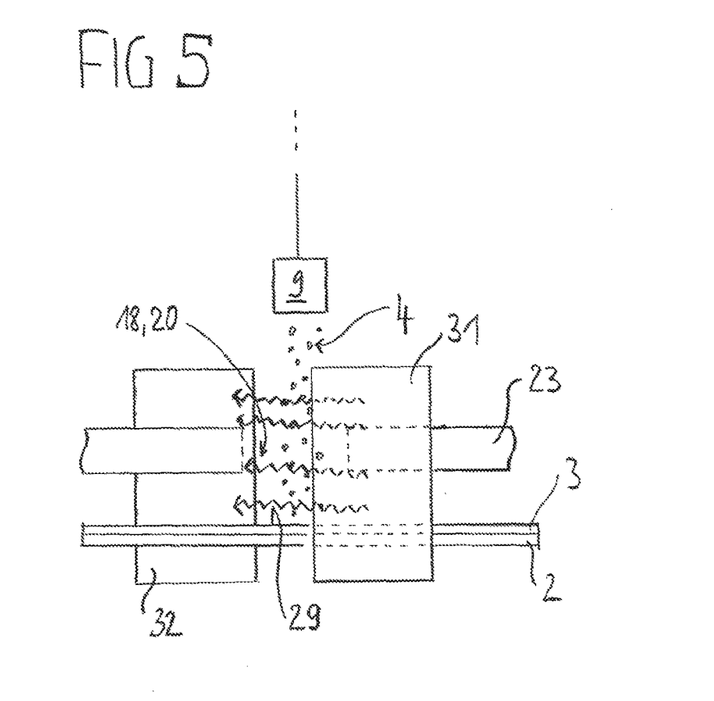
FIG. 5 is a detail of the apparatus according to the present invention having another additional heating and/or cooling device.

FIG. 5 shows a further exemplifying embodiment of the invention in which the additional heating and/or cooling device 22 is embodied to furnish a temperature-controlled gas flow 29 at the material application site, i.e. in this case in the region of coating opening 18. In this case, in the region of coating opening 18 a fan 31 connected to a heating or cooling element (not illustrated) is arranged on one side of build platform 2, and/or a suction device 32 is arranged on the opposite side of build platform 2, in such a way that the temperature-controlled gas flow 29 heats or cools build material 4 falling through the coating opening.

In further exemplifying embodiments (not depicted) the additional heating and/or cooling device 22 is embodied in such a way that the temperature-controlled gas flow 29 is furnished exclusively or additionally in the region of exposure opening 19 and/or in regions in the vicinity of exposure opening 19, in order to control the process temperature upon melting of build material 4. The heating and/or cooling device 22 whose flow affects the region of coating opening 18 can be embodied in such a way that gas flow 29 also passes over adjacent regions of object 3 or of build platform 2. It is also possible, however, to use multiple additional heating or cooling devices 22.

In summary, the invention relates to an apparatus 1 for manufacturing three-dimensional objects 3 by selective solidification of a build material 4 applied in layers, having a build platform 2, arranged in an X-Y plane, on which at least one three-dimensional object 3 is generated in layers; having a heating element 6, at least partly overlying the build platform 2, for inputting thermal energy 11 into the build material 4; having a drive device 15 for generating a relative motion in an X and/or Y direction between build platform 2 and the heating element 6, heating element 6 comprising at least two simultaneously usable functional openings 18, 19, one of the at least two functional openings being embodied as a material passthrough 18 and another of the at least two functional openings being embodied as a radiation passthrough 19. According to the present invention this apparatus 1 encompasses an additional heating and/or cooling device for controlling the temperature of build material 4 applied through material passthrough 18.

Advantageously, the additional heating and/or cooling device 22 encompasses a heat source 25 embodied to furnish thermal energy, one of the at least two functional openings 18, 19, 20 preferably being embodied simultaneously or exclusively as a heating opening 20 for additional input of thermal energy. Advantageously, the additional heating or cooling device 22 encompasses a cooling element embodied to extract thermal energy, one of the at least two functional openings 18, 19, 20 preferably being embodied simultaneously or exclusively as a cooling opening 20 for extraction of thermal energy. Advantageously, the additional heating and/or cooling device 22, in particular its heat source 25 or cooling element, is arranged in the immediate vicinity of functional opening 18 serving as a material passthrough, in particular at an edge of said functional opening 18. Advantageously, the additional heating and/or cooling device 22 is embodied to furnish a temperature-controlled gas flow. Advantageously, the additional heating and/or cooling device 22 furnishes the temperature-controlled gas flow in functional opening 18 and/or at the material application site.

Advantageously, heating element 6 constantly at least partly overlies the build platform 2. Advantageously, heating element 6 and the build platform 2 can be caused to overlie one another completely. Advantageously, heating element 6 is of substantially plate-shaped configuration. Advantageously, heating element 6 is arranged above build platform 2; it is either spaced away from the topmost build layer or touches the topmost build layer. Advantageously, build platform 2 is located inside a process chamber 12 that is closed in the operating state, and heating element 6 serves as a demarcating wall of process chamber 12. Advantageously, heating element 6 has regions capable of different temperature control. Advantageously, the shape, arrangements, and/or size of functional openings 18, 19, 20 are modifiable.

The invention furthermore relates to a method for manufacturing three-dimensional objects 3 by selective solidification of a build material 4 applied in layers, at least one three-dimensional object 3 being generated, in layers, on a build platform 2 arranged in an X-Y plane; a heating element 6 that at least partly overlies build platform 2 inputting thermal energy 11 into the build material 4; a drive device 15 generating a relative motion in an X and/or Y direction between build platform 2 and heating element 6; the heating element 6, utilizing at least two functional openings 18, 19, 20, allowing build material 4 and radiation energy 8 to pass through simultaneously. The method encompasses heating or cooling, by means of an additional heating and/or cooling device, of build material 4 applied through material passthrough 18.

All features presented in the specification, in the claims below, and in the drawings can be essential to the invention both individually and in any combination with one another.

LIST OF REFERENCE CHARACTERS

1 Apparatus for laser sintering
2 Build platform
3 Object
4 Build material
5 Drive direction (Z)
6 Heating element
7 Radiation source, laser
8 Laser beam
9 Furnishing/application device
10 Control system for material application
11 Thermal radiation
12 Process chamber
13 Cover
14 (unassigned)
15 Drive device (X/Y)
16 Drive control system (Z)
17 Drive control system (X/Y)
18 Functional opening, material passthrough, coating opening
19 Functional opening, radiation passthrough, exposure opening
20 Functional opening, heating and/or cooling opening
21 Drive and control device for laser
22 Heating and/or cooling device
23 Heating module
24 Heating control system
25 Radiation source, IR radiator
26 Infrared radiation
27 Control system for additional heating
28 Central control system
29 Gas flow
30 (unassigned)
31 Fan
32 Suction device

The invention claimed is:

1. An apparatus for manufacturing three-dimensional objects by selective solidification of a build material applied in layers, the apparatus comprising:
   a build platform on which at least one three-dimensional object is to be generated in layers, said build platform being disposed in an X-Y plane;
   a heating element for inputting thermal energy into the build material, said heating element at least partly overlying said build platform;
   a drive device for generating a relative motion between said build platform and said heating element in at least one of an X or Y direction;
   said heating element having at least two simultaneously usable functional openings formed therein, one of said at least two functional openings being embodied as a material passthrough and another of said at least two functional openings being embodied as a radiation passthrough; and
   an additional device for heating or for heating and cooling to control a temperature of the build material applied through said material passthrough.

2. The apparatus according to claim 1, wherein said additional device for heating or for heating and cooling includes a heat source constructed to furnish thermal energy.

3. The apparatus according to claim 2, wherein one of said at least two functional openings is embodied simultaneously or exclusively as a heating opening for an additional input of thermal energy.

4. The apparatus according to claim 2, wherein said heat source of said additional device for heating or for heating and cooling is disposed in an immediate vicinity of said functional opening serving as a material passthrough or at an edge of said functional opening serving as a material passthrough.

5. The apparatus according to claim 1, wherein said additional device for heating or for heating and cooling includes a cooling element constructed to extract thermal energy.

6. The apparatus according to claim 5, wherein one of said at least two functional openings is embodied simultaneously or exclusively as a cooling opening for an extraction of thermal energy.

7. The apparatus according to claim 5, wherein said cooling element of said additional device for heating or for heating and cooling is disposed in an immediate vicinity of said functional opening serving as a material passthrough or at an edge of said functional opening serving as a material passthrough.

8. The apparatus according to claim 1, wherein said additional device for heating or for heating and cooling is disposed in an immediate vicinity of said functional opening serving as a material passthrough or at an edge of said functional opening serving as a material passthrough.

9. The apparatus according to claim 1, wherein said additional device for heating or for heating and cooling is constructed to furnish a temperature-controlled gas flow.

10. The apparatus according to claim 9, wherein said additional device for heating or for heating and cooling furnishes said temperature-controlled gas flow at least one of through one of said at least two functional openings or at a material application site.

11. A method for manufacturing three-dimensional objects by selective solidification of a build material applied in layers, the method comprising the following steps:
generating at least one three-dimensional object in layers on a build platform disposed in an X-Y plane;
inputting thermal energy into the build material by using a heating element at least partly overlying the build platform;
generating a relative motion between the build platform and the heating element in at least one of an X or Y direction by using a drive device;
allowing build material and radiation energy to simultaneously pass through at least two functional openings in the heating element; and
using an additional device for heating or for heating and cooling to heat or to heat and cool the build material applied through one of the at least two functional openings serving as a material passthrough.

12. An apparatus for manufacturing three-dimensional objects by selective solidification of a build material applied in layers, the apparatus comprising:
a build platform on which at least one three-dimensional object is to be generated in layers, said build platform being disposed in an X-Y plane;
a heating element for inputting thermal energy into the build material, said heating element at least partly overlying said build platform;
a drive device for generating a relative motion between said build platform and said heating element in at least one of an X or Y direction;
said heating element having at least two simultaneously usable functional openings formed therein, one of said at least two functional openings being embodied as a material passthrough and another of said at least two functional openings being embodied as a radiation passthrough; and
an additional device for at least one of heating or cooling to control a temperature of the build material applied through said material passthrough, said additional device for at least one of heating or cooling including a heat source constructed to furnish thermal energy.

13. The apparatus according to claim 12, wherein one of said at least two functional openings is embodied simultaneously or exclusively as a heating opening for an additional input of thermal energy.

14. The apparatus according to claim 12, wherein said heat source of said additional device for at least one of heating or cooling is disposed in an immediate vicinity of said functional opening serving as a material passthrough or at an edge of said functional opening serving as a material passthrough.

* * * * *